June 5, 1923.
O. P. EDWARDS
1,457,509
SHOCK ABSORBING APPARATUS FOR VEHICLES
Filed March 1, 1922.  2 Sheets-Sheet 1
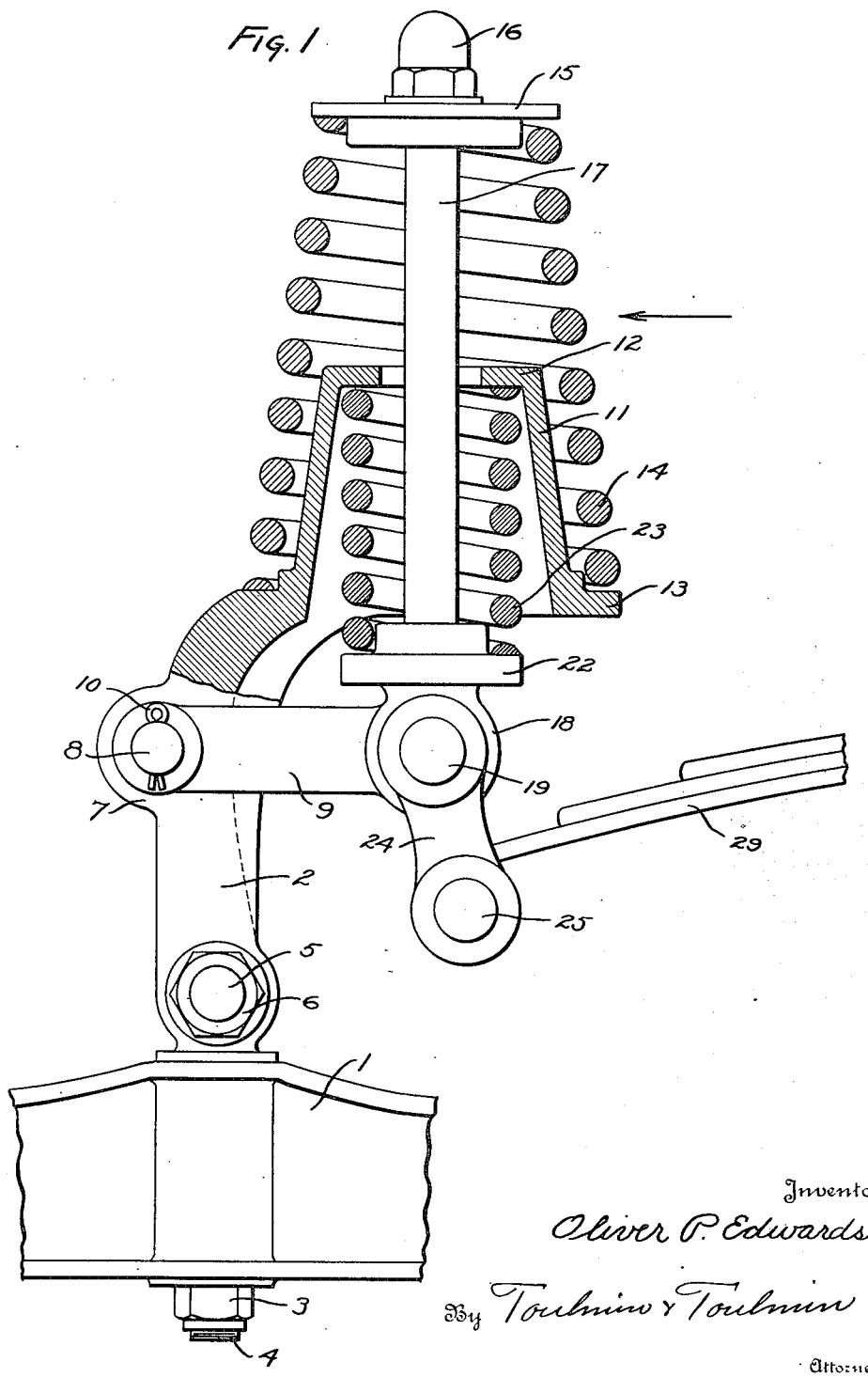
Inventor
Oliver P. Edwards
By Toulmin & Toulmin
Attorney June 5, 1923.
O. P. EDWARDS
1,457,509
SHOCK ABSORBING APPARATUS FOR VEHICLES
Filed March 1, 1922　　2 Sheets-Sheet 2
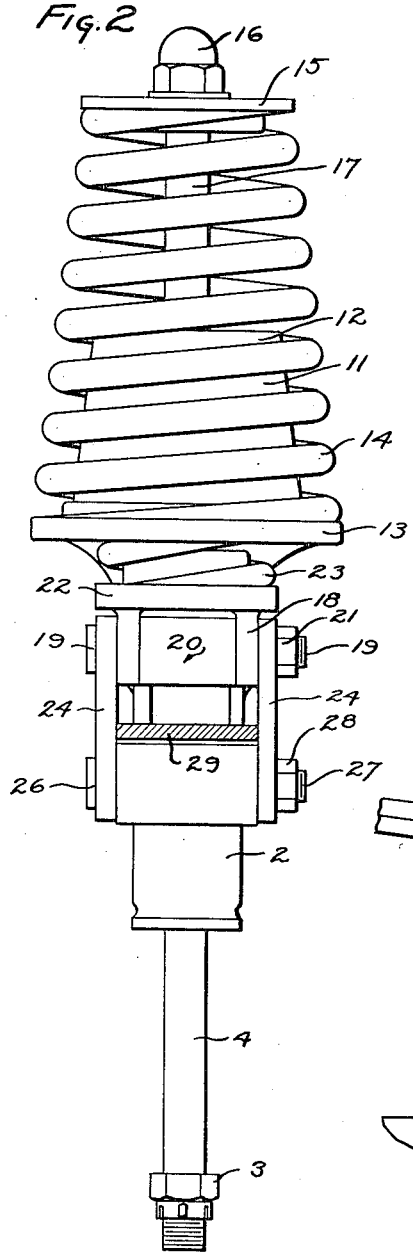
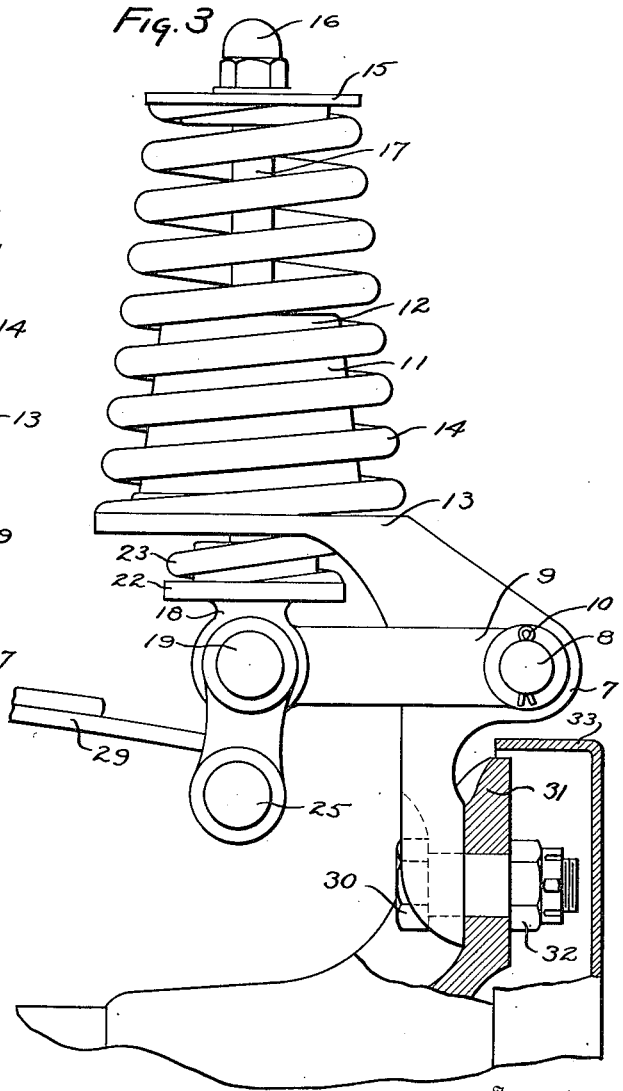
Inventor
Oliver P. Edwards
By Toulmin & Toulmin
Attorney Patented June 5, 1923.

1,457,509

UNITED STATES PATENT OFFICE.

OLIVER P. EDWARDS, OF LEIPSIC, OHIO.

SHOCK-ABSORBING APPARATUS FOR VEHICLES.

Application filed March 1, 1922. Serial No. 540,303.

*To all whom it may concern:*

Be it known that I, OLIVER P. EDWARDS, a citizen of the United States, residing at Leipsic, in the county of Putnam and State of Ohio, have invented certain new and useful Improvements in Shock-Absorbing Apparatus for Vehicles, of which the following is a specification, reference being had therein to the accompanying drawing.

My invention relates to vehicles and in particular to shock absorbing apparatus therefor.

It is an object of my invention to provide a shock absorber for vehicles and in particular a shock absorber for automobiles. It is my object to provide a shock absorber that may be readily substituted on automotive vehicles and the like for existing parts so that no modification of position of existing parts or any drilling or webbing of the parts will be necessary.

It is my object to provide a shock absorber which may be readily installed by an unskilled person and will fit in the restricted area available on existing automotive vehicles. It is also my object to provide a shock absorber which is adaptable for installation at the factory.

In particular, it is an object of my invention to provide a shock absorber and a snubber in combination. It is my object to provide means of dampening the shock and dampening the rebound. It is my object to provide a means of controlling the main spring of the vehicle and the movements of the vehicle itself with respect to the axle in both directions of its movement.

It is my object to provide such shock absorbing or dampening means and snubbing or rebound dampening means in combination, utilizing resilient elements having characteristics different from the characteristics of the main spring. It is my object to provide elements in my shock absorber and rebound member which will operate out of synchronism with the leaf spring, thereby providing a means for the positive delivery of the shock through the elements of my shock absorber of one rate of vibration to the leaf spring or main spring of the vehicle of another rate of vibration and also provide for the dampening of the return wave of the shock from the leaf spring back to the axle through a reducing medium of different characteristics of the leaf spring or main spring of the vehicle and out of synchronism therewith.

It is my object to provide a medium of one period of vibration, preferably of readily yielding nature and susceptible of very rapid vibration in order to first break up the shock into a large number of impulses and then to provide a shock absorbing medium such as a leaf spring which will convert each one of these relatively vigorous, rapidly occurring shocks into slow moving pulsations or vibrations and upon the reflex action or rebound and upon the return wave of the shock I provide a rapidly moving non-synchronous element to further break up the component parts of the blow which remain.

It is also my object to provide by this means last mentioned additional apparatus for maintaining the wheels on the ground and thereby eliminating the present objectionable feature of the wheels leaving the ground, resulting in unnecessary wear on the tires and the remainder of the vehicles and in the case of the rear wheels, a considerable loss in driving power on the part of the engine due to the failure of the wheels to maintain contact with the ground at all times.

In illustration of my invention, as a typical installation, I have shown my shock absorber and rebound member in combination in a mechanism applied to a Ford car.

These drawings are as follows:

Fig. 1 is a front elevation, partially in section, of a front axle installation;

Fig. 2 is an end elevation of Fig. 1, looking in the direction of the arrow from the leaf spring side outwardly;

Fig. 3 is an elevation partially in section to show the method of installation on the axle with relation to the brake drum of my apparatus on the rear axle of a Ford car.

It will be understood that while I have illustrated the adaptation of my invention to a Ford car, I do not desire to limit myself to any particular automotive vehicle but comprehend its adaptation to all situations where it will be useful in absorbing shock and rebound impulses.

In detail, the drawings are to be described as follows: The numeral 1 represents the axle of the vehicle through which the usual spring shackle is normally inserted and in the place of which the stanchion 2 of my mechanism has been installed. The stanchion is retained in position by the nut 3 on the threaded end 4 of the stanchion. 5 indicates the usual reach rod that projects through the stanchion in such a vehicle as a Ford, upon which is mounted the retaining nut 6. The stanchion 2 has an enlarged portion 7 which is drilled to receive a cross member 8 having on either side thereof a radius link 9. On one end of 8 is a head of customary character, as 9 is a bolt of any desired form, and in order to retain the members in engagement with one another a cotter pin 10 is inserted in 8.

The upper end of the stanchion 2 terminates in a cone-shaped member 11 having a cap 12 and a flange 13. Upon the flange 13 the main shock absorbing spring of the mechanism is mounted. This is designated 14. It loosely surrounds 11 and is preferably of conical shape in its general outline. The cross section of this spring is not of importance as it may be varied to suit varying conditions. Upon the upper end of this spring rests a plate 15 retained in engagement therewith by a nut 16 threaded on the upper end of a pin 17, that is adapted to move substantially vertically during the action of the device.

The lower end of this pin terminates in an eye 18 through which passes a bolt 19. This bolt also passes through corresponding eyes in the radius links 9. It will be observed that there are two eyes 18 and that a collar 20 is interposed therebetween for the purpose of excluding dirt on the bolt 19 and its bearings. 19 is retained in position by a nut 21.

Just above the eyes 18 on the pin 17 is a platform 22 upon which rests a helical spring 23 at its lower end. At the upper end of this spring it will be seen that it engages with the underside of 12.

Swung upon 19 at either end thereof are freely turning shackle links 24 retained in position by a shackle bolt 25 having a head 26 at one end and a threaded end 27 at the other upon which is mounted the usual nut 28. This serves to retain in position the bolt 25 which passes through the eye in the leaf spring 29 that is mounted to the vehicle in the customary manner.

Referring to Fig. 3 which illustrates the installation of the device upon the rear axle of the vehicle, it will be observed that the usual stanchion and vehicle of this type has been removed and in its place the stanchion of the device now in question has been installed. The bolt 30 passes through the axle flange 31 and is retained by a nut 32. This arrangement is enclosed by the brake drum 33.

The remainder of the parts are similar to those already described and bear the same numerals. The action is the same, and the only difference between the two devices in the front and the rear is their detail method of installation necessitated by the character of construction of the vehicle to which they are applied.

It will be noted that a helical spring is employed for both the shock absorbing portion of the work of this device and for the rebound absorbing portion of the work. Helical springs are characteristically of a rapid rate of vibration and respond quickly and readily to shock of varying degrees, breaking them up into a number of sharp pulsations or blows. Such springs are in distinct contrast to the slow moving leaf springs which are enabled to absorb heavier shock but much more slowly. It has been found that to pass road shocks directly into such leaf springs that if the shock is especially heavy or especially rapid, the leaf spring becomes to all intents and purposes simply a solid member or a bar and the shock passes directly through the spring without being absorbed and dampened appreciably with consequent injury to the vehicle and discomfort to the passengers carried thereby. If the shock which is communicated to the leaf spring can be delivered in smaller amounts even of great force, such impulses will be suitably dampened or retarded in their passage to the leaf spring which will have time to respond to them as they pass through the leaf spring in succession, thus ironing out these vigorous blows as they are delivered in succession, which would not be the case if the sum total of them were delivered at one blow, thus overwhelming the spring before it would have a chance to function according to its normal characteristics.

So the principle is adopted of utilizing a rapidly moving element such as a helical spring through which the shock must primarily pass and thence passing it in its modified form to the slow moving spring which is particularly adapted to handle it.

In the event that the shock is of particular violence and it passes through the coil spring and thence to the leaf any rebound will again be absorbed by the second helical spring 23. The tendency of 23 is to always maintain the various parts in co-operation with 14 in their normal relationship and to resist the movement of the wheels off of the ground. For instance, upon the imparting of a considerable shock to the axle through the road wheels and the transmission of that shock through 23 to 29 and to the vehicle, there will be the normal rebound which has a tendency to lift the wheels off of the ground. 23 is designed to absorb this reflex action and to dampen the shock and sew up the movement of the vehicle in its accompanying parts in its reverse direction thus furnishing a very complete unit for shock absorption and the absorption of the rebound particularly found in automotive vehicle travel in high speed over rough pavements or roads. 23 forms a secondary reserve of shock absorbing medium, particularly useful in case of heavier shocks due to very rough roads or short sharp impacts due to very rough streets, thus adapting the device to varying types of roadway and to varying types of load on the vehicle which is one of the facts in rebound action.

It will be understood in mentioning definitely helical springs and a leaf springs that they are discussed as typical specimens of a non-synchronous combination of resilient elements and it is not desired to confine my invention to such elements alone.

In addition to the foregoing, my invention is characterized by the fact that the secondary member 23 is in such a position as to always maintain a yielding pressure of 15 to 14 and 14 in turn upon 13, thus despite the wear that may take place on the parts there will be no rattling. It will also be observed that there are no parts to be lubricated save the links. 11 and 12 form a suitable arrangement for maintaining 23 in position and serve also to position positively the location of 14. 14 cannot jump out of position during particularly heavy shocks nor be dislocated because of the extensive wall of 11.

It will be understood that if desired 11 may be made either solid or in the frame work and any desired pattern may be employed. It will be understood that I comprehend within my invention helical springs, either of a conical shape or of any other desired type as such springs will have to be modified to different vehicles and different weights of vehicles.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. In combination, a stanchion mounted on an axle, a supporting plate thereon, an elongated hollow frusto-conical projection on said plate having a cap thereon with an aperture in the center thereof, a conical resilient element mounted on said plate and having its lower portion surrounding said conical member, a suspension member within said conical resilient element passing through said aperture, a plate on the top of said suspension member, and means for retaining it thereon, said plate being adapted to prevent the shifting of the top of the resilient element with reference to the suspension member, a second plate on the other end of said suspension member, a second resilient element interposed between the bottom of the cap member of the conical member and said plate on the bottom of the suspension member, said second resilient element being housed for the greater portion of its length within the conical member and thus within the lower portion of the first resilient member, and means for connecting a leaf spring pivotally to the bottom of said suspension member.

2. In combination, a stanchion mounted on an axle, a supporting plate thereon, an elongated hollow frusto-conical projection on said plate having a cap thereon with an aperture in the center thereof, a conical resilient element mounted on said plate surrounding said conical member, said resilient element and conical member being so proportioned that the conical member extends upwardly into the resilient member to a point substantially one-half the height of said element, a suspension member within said conical resilient element passing through said aperture, a plate on the top of said suspension member, means for retaining it thereon, said plate being adapted to prevent the shifting of the top of the resilient element with reference to the suspension member, a second plate on the other end of said suspension member, a second resilient element interposed between the bottom of the cap member of the conical member and said plate on the bottom of the suspension member, said second resilient member being housed within the hollow frusto-conical member for substantially its entire length, means for connecting a leaf spring pivotally to the bottom of said suspension member, a radius link pivoted to said stanchion and pivoted to said suspension member at the bottom to guide said suspension member.

3. In combination, a stanchion having an elongated vertical frusto-conical chamber open at the bottom, a conical resilient element with a broad base and a relatively narrow top mounted thereon said element having a given characteristic as a spring, a suspension member suspended from the top thereof passing through the conical chamber, a second resilient element interposed between one end of the suspension member and one end of the conical chamber and positioned with substantially its entire length in said chamber, said chamber and elements being thus arranged to house the chamber in the first element and to house the second element in the chamber within said chamber, a radius link pivoted to one end of the suspension member and also to the stanchion, a third resilient element suspended from the suspension member having a different spring characteristic than the other resilient elements whereby the shock first passes through the first resilient element, the rebound is snubbed by the second resilient element and the remaining shock is dampened by the third resilient element.

4. In combination, a stanchion mounted upon an axle, said stanchion having a housing mounted on the top thereof, a spring surrounding said housing and projecting above it, a pin suspended from the top of said spring within the spring and passing through the housing, a radius link pivoted on the stanchion beneath the housing having its free end connected to a leaf spring, and a second helical spring mounted on said radius link surrounding the lower end of said pin and having its upper end within said housing telescoped within said first mentioned spring.

In testimony whereof, I affix my signature.

OLIVER P. EDWARDS.